(12) United States Patent
Chun et al.

(10) Patent No.: US 8,356,893 B2
(45) Date of Patent: Jan. 22, 2013

(54) INK COMPOSITION CONTAINING NON-VOC LIQUID CARRIER

(75) Inventors: Doris Pik-Yiu Chun, Santa Clara, CA (US); Howard S. Tom, San Jose, CA (US); Hou T. Ng, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 274 days.

(21) Appl. No.: 12/752,763

(22) Filed: Apr. 1, 2010

(65) Prior Publication Data

US 2011/0242241 A1   Oct. 6, 2011

(51) Int. Cl.
  *C09D 11/02* (2006.01)
(52) U.S. Cl. ........................................ 347/100
(58) Field of Classification Search ............ 347/100
  See application file for complete search history.

(56) References Cited

U.S. PATENT DOCUMENTS

| | | | |
|---|---|---|---|
| 5,902,841 A * | 5/1999 | Jaeger et al. | 523/161 |
| 6,723,820 B1 * | 4/2004 | Arcurio et al. | 528/61 |
| 2002/0149659 A1 * | 10/2002 | Wu et al. | 347/102 |
| 2004/0242837 A1 | 12/2004 | Toyoda et al. | |
| 2006/0128831 A1 | 6/2006 | Cook et al. | |
| 2007/0082963 A1 * | 4/2007 | Bhatt | 522/6 |
| 2007/0289488 A1 | 12/2007 | McIntosh et al. | |
| 2007/0291080 A1 * | 12/2007 | Nakamura | 347/52 |

FOREIGN PATENT DOCUMENTS

| | | |
|---|---|---|
| JP | 2005200563 A | 7/2005 |
| JP | 2005336298 A | 12/2005 |
| JP | 2005336299 A | 12/2005 |
| WO | WO 2007/147303 A1 | 12/2007 |
| WO | WO 2008/048983 A2 | 4/2008 |

* cited by examiner

*Primary Examiner* — Laura Martin

(57) ABSTRACT

Ink composition including non-VOC liquid carrier and method of making the same are disclosed. A disclosed example ink composition has a viscosity that is below about 70.0 cps and includes non-VOC liquid carrier, dispersing agents and pigment particles having an average size of less than about 10 μm. Also disclosed are method of use and method of making such ink composition containing non-VOC liquid carrier.

14 Claims, No Drawings

INK COMPOSITION CONTAINING NON-VOC LIQUID CARRIER

BACKGROUND

The printing industry uses different types of recording fluids such as oil-based inks, solvent-based (non-aqueous) inks, water-based inks and solid inks (which are melted in preparation for dispensing). Solvent-based inks are fast drying, and as a result, are widely used for industrial printing. When solvent-based inks containing binders and other ingredients are applied onto a substrate, the solvents partially or fully evaporate from the ink, leaving the binder and other ingredients such as pigment particles on the printed substrate in the form of a dry film. During the drying process, the solvents, which are often volatile organic compounds (VOC), emit vapors, and therefore, can pollute the environment. Such pollution problem becomes more critical for higher printing speeds or for wide format images, where large amounts of ink are deposited onto a substrate. There has been developed non-VOC (Volatile Organic Compound) or VOC-less printing inks. However, such inks present poor printing performances and quality and/or often create damages to the print head containing it.

DETAILED DESCRIPTION

Before particular embodiments of the present disclosure are disclosed and described, it is to be understood that the present disclosure is not limited to the particular process and materials disclosed herein as such and may vary to some degree. It is also to be understood that the terminology used herein is used for describing particular embodiments only and is not intended to be limiting, as the scope of the present invention will be defined only by the claims and equivalents thereof. In describing and claiming the present exemplary composition and method, the following terminology will be used: the singular forms "a", "an", and "the" include plural referents unless the context clearly dictates otherwise. Thus, for example, reference to "a pigment" includes reference to one or more of such materials. Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a weight range of approximately 1 wt % to about 20 wt % should be interpreted to include not only the explicitly recited concentration limits of 1 wt % to about 20 wt %, but also to include individual concentrations such as 2 wt %, 3 wt %, 4 wt %, and sub-ranges such as 5 wt % to 15 wt %, 10 wt % to 20 wt %, etc. Wt % means herein percentage by weight. All percents are by weight unless otherwise indicated.

As used herein, "image" refers to marks, signs, symbols, figures, indications, and/or appearances deposited upon a material or substrate with either visible or an invisible ink composition. Examples of an image can include characters, words, numbers, alpha-numeric symbols, punctuation, text, lines, underlines, highlights, and the like.

In some embodiments, the ink composition is an ink composition having a viscosity which is below about 70.0 cps and that contains a non-VOC liquid carrier, dispersing agents and pigment particles having an average size of less than about 1 μm.

The ink composition of the present disclosure provides thus a non-aqueous solvent-based ink composition that does not pollute the environment, while still having good printing characteristics for industry. The ink composition of the present disclosure has good printing performances while not creating printing issues such as puddling on the orifice plate or nozzle clogging. In addition, the ink composition is stable over time. In some embodiments, the present disclosure refers therefore to stable and reliable ink compositions, that have good printing performances, that are environmentally friendly and that produce higher quality print images on the print media surface without damaging the printhead containing it.

In some examples, the ink composition has the benefit a being a biodegradable non-aqueous dielectric carrier which is classified both as a non-SARA (Superfund Amendments & Reauthorization Act) and a non-HAP (Hazardous Air Pollutant) in the U.S. The ink composition of the present disclosure is also classified as a non-VOC per European Union and Emission Directives, Australian Paint Approval Scheme, and China State Environmental Protection Agency. The term "Hazardous Air Pollutants" or "HAPs" is a broad term applied to any chemical, physical (e.g. particulate matter), or biological agent that releases environmental contaminants negatively modifying the natural characteristics of the atmosphere. Accordingly, non-HAPs are materials that do not release environmental contaminants modifying the natural characteristics of the atmosphere. The U.S. Environmental Protection Agency (EPA) has published a list of hazardous air pollutants (HAPs), which is found in the Clean Air Act 112(b) (as amended 1990).

In some embodiments, the ink composition disclosed herein includes a non-VOC liquid carrier. In some examples, the ink composition does not contain any volatile organic solvent (VOC). As volatile organic solvent (VOC), it is mean herein any organic compound having an initial boiling point less than or equal to 250° C. (when measured at standard pressure). As non-volatile organic solvent (non-VOC), it is meant herein any organic compound having an initial boiling point superior to 250° C. (when measured at standard pressure).

In some examples, the ink composition has a viscosity that is below about 70.0 cps. In some other examples, the ink composition has a viscosity within the range of from about 1.0 to about 50.0 cps or within the range of from about 5.0 to about 25.0 cps. In some other examples, the ink composition has a viscosity within the range of from about 10.0 to about 20.0 cps, when measured at 25° C., in order to achieve the desired rheological characteristics. The viscosity of the ink composition might be conveniently regulated, as known to those of ordinary skill in the art, for instance, by suitable use of other additives. In some other examples, the ink composition has a viscosity that is below 50.0 cps, when measured at 25° C., and has, at least, 10 wt % of total weight of ink composition of non volatile substances (NVS). In some examples, the ink composition has a viscosity that is below 35.0 cps.

In some examples, the ink composition has a field conductivity of about 10 to about 5000 pS/cm. In some other examples, the ink composition has a field conductivity of about 100 to about 3000 pS/cm.

In some examples, the ink composition has weight percentage of non-volatile substances (NVS) between about 3 wt % and about 80 wt % of total weight of ink composition. In some other examples, the ink composition has weight percentage of non-volatile substances that is between about 5 wt % and about 60 wt % of total weight of ink composition. In yet other examples, the ink composition has weight percentage of non-volatile substances that is between about 7 wt % and about 50 wt % of total weight of ink composition. As used herein, the percentage of non-volatile substances (% NVS) represents the percentage of solid ingredient present in the ink composition. In some examples, the non-volatile substances (NVS) include the pigment and the dispersing agent. It is believed that such high level of non-volatile substances has the benefit of generating ink compositions that have good durability on media and that generate printed images with good optical density.

In some examples, the ink composition is an inkjet ink printing composition. By inkjet composition, it is meant herein that the ink composition is very well adapted to be used in an inkjet device and in an inkjet printing process. In some other examples, the ink composition is very well adapted to be used in an indirect printing system, i.e. in a system wherein the ink composition is applied onto an intermediate transfer surface (such as a blanket). In yet some other examples, the ink composition is very well adapted to be used in thermal printheads, enabling the freedom to jet either via thermal or piezo-induced mechanical mechanism.

In some examples, the ink composition is an electronic ink. As electronic ink, it is meant herein an electrophoretic fluid that contains charged particles capable of adsorbing a charge. Such particles are in suspension in a liquid carrier. Some electronic inks may be referred to as electrophoretic inks where the charged particles may be moved with a Coulombic force exerted on the particles by an applied electrical signal. In some examples, the ink compositions disclosed herein are suitable for use in a variety of applications, including display applications, electronic skins, blanket jetting applications, digital printing applications, ion beam printing applications, or other printing applications.

In some examples, the ink composition is well adapted to transfer ink layers from elastomeric blankets to various substrates. In other words, the ink composition of the present disclosure is very well adapted to be used in digital commercial printing.

The ink composition disclosed herein includes a non-VOC liquid carrier. In some examples, the non-VOC liquid carrier is a non-polar liquid carrier. In some other examples, the liquid carrier has a resistivity in excess of about 500 pS/cm and a dielectric constant below about 3.0. In some examples, the liquid carrier has a resistivity ranging from about 0 to about 100 pS/cm.

In some embodiments, the non-VOC liquid carrier is an ester alcohol. In some other embodiments, the non-VOC liquid carrier is an ester alcohol having the formula:

$$R_1-C(O)-(O)-R_2-(OH)_n$$

wherein, in this formula, $R_1$ and $R_2$ are branched, cyclic or unbranched alkyl groups, each group containing from 1 to 15 carbon atoms and n is from 1 to 4.

In some examples, $R_1$ and $R_2$ are branched, cyclic or unbranched alkyl groups, each group contains from 1 to 10 carbon atoms. In some other examples, $R_1$ and $R_2$ are branched alkyl groups, each group contains from 2 to 8 carbon atoms. In some examples, $R_1$ is a branched alkyl group containing 3 or 4 carbon atoms or $R_1$ is a branched alkyl group containing 3 carbon atoms. In some other examples, $R_2$ is a branched alkyl group containing from 7 to 9 carbon atoms or $R_2$ is a branched alkyl group containing 8 carbon atoms. In yet some other examples, n is 1. In some examples, $R_1$ is $CH(CH_3)_2$. In some other examples, $R_2$ is $CH-C(CH_3)_2-CH[C(CH_3)_2]$. In yet some other examples, the liquid carrier is 2,2,4-trimethyl-1,3-pentanediol mono-isobutyrate.

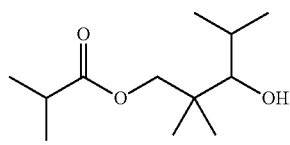

The term "alkyl" as used herein means a branched, cyclic or unbranched saturated hydrocarbon group, which typically, although not necessarily, contains from 1 to about 30 carbon atoms, or 1 to about 20 carbon atoms, or 1 to about 10 carbon atoms for example. Alkyls include, but are not limited to, methyl, ethyl, n-propyl, isopropyl, n-butyl, isobutyl, t-butyl, octyl, and decyl, for example, as well as cycloalkyl groups such as cyclopentyl, adamantyl and cyclohexyl, for example. In some other examples, R is a lower alkyl group. The term "lower alkyl" means an alkyl group having from 1 to 8 carbon atoms. In some other examples, R is a substituted alkyl group or a heteroalkyl alkyl group. As used herein, the term "substituted alkyl" means an alkyl substituted with one or more substituent groups. The term "heteroalkyl" means an alkyl in which at least one carbon atom is replaced with a heteroatom.

In some examples, the non-VOC liquid carrier is present in an amount representing from about 15 to about 99 weight percent by total weight of the ink composition. In some other examples, the non-VOC liquid carriers is present in an amount representing from about 25 to about 75 weight percent by total weight of the ink composition.

In some embodiments, the ink composition includes pigment particles. In some examples, the pigment particles of the ink composition are dispersed in the liquid carrier and are present in the ink composition in a form of dispersion. The term dispersion is used herein to denote a mixture, in which solid particles are scattered throughout a liquid. In some examples, such dispersions are stable such that the particle size distribution is maintained over long period of time, for instance, more than a year.

The pigment particles for use herein have an average particle size of less than about 10 μm. In some examples, the pigment particles have an average particle size of less than about 1 μm. In some other examples, the pigment particles have an average particle size that is between 10 nm and 1 μm. In yet some other examples, the pigment particles have an average particle size between 100 nm and 700 nm and, in yet some other examples, the pigment particles have an average size between 50 nm and 500 nm. In another illustration, about 95% of the pigment particles have a particle size that is below 500 nm. Size referred herein is the diameter size of particles. Without being bound to any theory, it is believed that it is within this specific size and quantity that the ink compositions have the optimum printing performances and involve less amount of ink in view of obtaining good printing results.

In some examples, the pigment particles represent from about 1 wt % to about 50 wt % of the total weight of the ink composition. In some other examples, the pigment particles represent from about 2.5 wt % to about 25 wt % of the total weight of the ink composition and, in yet some other examples, the pigment particles represent from about 4 wt % to about 15 wt % of the total weight of the ink composition.

The pigment can include, but are not limited to, cyan pigments, magenta pigments, yellow pigments, white pigments, black pigments, and any combinations thereof. In some examples, the pigment can include, but are not limited to, Helliogen® Blue pigment (available from BASF), Helliogen® Green pigment (available from BASF), Cyan pigment (available from Toyo), Heuco® Blue pigment (available from Heubach). In some examples, the pigment can include, but are not limited to, optically variable pigments, thermochromic pigments, photochromic pigments, phosphorescent pigments, electroluminescent pigments, photoluminescent pigments, and combinations thereof. Illustrative examples of potentially suitable pigment are Cabot Mogul L (black), Monastral Blue G® (C.I. Pigment Blue 15 C.I. No. 74160), Quindo® Magenta (Pigment Red 122), Indo® Brilliant Scarlet Toner (Pigment Red 123, C.I. No. 71145), Dalamar® Yellow (Pigment Yellow 74, C.I. No. 11741), blue pigment BT-383D (DuPont), yellow pigment YT-717D (DuPont), red pigment RT-455D (DuPont) and blue pigment Helioecht® Blue GO (Bayer). Another example of the pigment includes Paliotol® yellow D1155 available from BASF.

In some examples, pigment particles are organic or inorganic pigment particles. Suitable inorganic pigments include, for example, carbon black. However, other inorganic pigments may be suitable such as titanium oxide, cobalt blue ($CoO—Al_2O_3$), chrome yellow ($PbCrO_4$), and iron oxide. Suitable organic pigments include, for example, azo pigments including diazo pigments and monoazo pigments, polycyclic pigments (e.g., phthalocyanine pigments), insoluble dye chelates, nitropigments, nitroso pigments, and the like. Representative examples of phthalocyanine blues include copper phthalocyanine blue and derivatives thereof (Pigment Blue 15). Representative examples of quinacridones include Pigment Orange 48, Pigment Orange 49, Pigment Red 122, Pigment Red 192, Pigment Red 202, Pigment Violet 19 and Pigment Violet 42. Representative examples of anthraquinones include Pigment Red 43, and Pigment Red 226. Representative examples of perylenes include Pigment Red 149 (Scarlet), Pigment Red 179, Pigment Red 190, Pigment Violet 19, and Pigment Red 224. Representative examples of heterocyclic yellows include Pigment Yellow 1, Pigment Yellow 3, Pigment Yellow 17, Pigment Yellow 65, Pigment Yellow 73, Pigment Yellow 74, Pigment Yellow 155, Pigment Yellow 83 and Pigment Yellow 138. Such pigments are commercially available in either powder or press cake form from a number of sources including, BASF Corporation, Engelhard Corporation and Sun Chemical Corporation. In some examples, examples of black pigments that are used include carbon pigments. The carbon pigment is any commercially available carbon pigment that provides acceptable optical density and print characteristics. Carbon pigments suitable for use in examples of the present disclosure include, without limitation, carbon black, graphite, vitreous carbon, charcoal, and combinations thereof. Such carbon pigments can be manufactured by a variety of known methods such as a channel method, a contact method, a furnace method, an acetylene method, or a thermal method, and are commercially available from such vendors as Cabot Corporation, Columbian Chemicals Company, Degussa AG, and E.I. DuPont de Nemours and Company. Suitable carbon black pigments include, without limitation, Cabot pigments such as Monarch 1400, Monarch 1100, CAB-O-JET 200, Black Pearls, and Vulcan pigments; Columbian pigments such as Raven 7000 and Raven 3500; Degussa pigments such as Color Black FW 200, Raven FW S170, Special Black 6, Special Black 5, Special Black 4, and Printex 140V; and Tipure R-available from Dupont and the like. Examples of other suitable colored pigments are described in the Colour Index, 3rd edition (The Society of Dyers and Colourists, 1982). The above list of pigments includes unmodified pigment particulates, small molecule attached pigment particulates, and polymer-dispersed pigment particulates. Other pigments not specifically listed can also be suitable for use within embodiments of the present disclosure.

The ink composition involves the property of being compatible with a cyan pigment, a magenta pigment, a yellow pigment, a black pigment, and combinations thereof. Such compatibility allows development of CMYK color systems. In addition, such compatibility allows tuning or adjustment of the color gamut. Individual particles may include more than one of the CMYK pigments and/or other base or secondary pigments and may exhibit any color from various pigment combinations, such as, any color within the available Pantone spot color space. Thus, in some examples, the pigments are cyan pigments, magenta pigments, yellow pigments, black pigments or any combinations thereof.

In some embodiments, the ink composition contains dispersing agents or a mixture of dispersing agents (or dispersants). In some examples, the dispersing agents represent from about 0.1 wt % to about 50 wt % of the total weight of the ink composition. In some other examples, the dispersing agents represent from about 1 wt % to about 10 wt % of the total weight of the ink composition and, in yet other examples, the dispersing agents represent from about 2 wt % to about 7 wt % of the total weight of the ink composition.

Suitable dispersing agents often include molecules with a polar portion and a non-polar portion, such as the lithium, cadmium, calcium, manganese, magnesium and zinc salts of heptanoic acid; the barium, aluminum, cobalt, manganese, zinc, cerium and zirconium salts of 2-ethyl hexanoic acid, (as metal octoates); the barium, aluminum, zinc, copper lead and iron salts of stearic acid; the calcium, copper, manganese, nickel, zinc and iron salts of naphthenic acid; and ammonium lauryl sulfate, sodium dihexyl sulfosuccinate, sodium dioctyl sulfosuccinate, aluminum diisopropyl salicylate, aluminum dresinate, aluminum salt of 3,5 di-t-butyl gamma resorcylic acid. Mixtures of these materials may also be used. In some examples, dispersing agents include lecithin (Fisher Inc.); OLOA-1200®, a polyisobutylene succinimide available from Chevron Chemical Company; basic barium petronate (Witco Inc.); zirconium octoate (Nuodex); aluminum stearate; salts of calcium, manganese, magnesium and zinc with heptanoic acid; salts of barium, aluminum, cobalt, manganese, zinc, cerium, and zirconium with octanoic acid; salts of barium, aluminum, zinc, copper, lead, and iron with stearic acid; iron naphthenate; acrylic copolymers, such as RCP 1257, available from E. I. Du Pont de Nemours and Co.; and the like, as well as mixtures thereof. In other examples, Solsperse11200® and Solsperse9000®, both available from Lubrizol and OLOA-1200® available from Chevron are used as dispersing agent. In some examples, OLOA 1200®, Solsperse9000® or Solsperse 11200® are used as dispersing agents.

In some examples, the ink composition can contain others additives such as a surface modifier, compatibility additives, a viscosity control agent media additives, fixing additives and other additives. In some other examples, a viscosity control agent assists in maintaining viscosity of starting materials combined in a resin grinding and pigment dispersion process to adequately reduce particle size.

Exemplary embodiment of method of making an ink composition, having a viscosity that is below about 70.0 cps, includes, firstly, loading the pigment in a non-VOC liquid carrier to form ink slurry; then, microfluidizing, milling, or homogenizing such mixture until the desired particle size and until a stable dispersion is achieved. In some examples, the method includes dissolving, at least, a dispersing agent in a non-VOC liquid carrier, incorporating pigment particles into the dispersant containing non-VOC liquid carrier; then, microfluidizing, milling, or homogenizing such mixture until the pigment particles have an average size of less than about 10 μm. In some examples, the dispersing agent is first dissolved in the carrier, and then from about 4 wt % to about 15 wt % of pigment particles is loaded into the solution and allowed to incubate overnight. The dispersion is subsequently microfluidized for less than 80 minutes until the desired particle size and a stable dispersion is achieved. In some examples, the resulting inks are filtered through 1 micron filters prior to testing. In some other examples, the liquid carrier and the pigment are mixed in a mixer (e.g., double planetary mixer and the like). Other components such as, but not limited to, the charge adjuvant, organic/inorganic pigments, surface modifiers, and additives, can be added to the slurry at this stage and/or during the next stage. The resulting composition often contains a relatively high concentration of non-volatile solids (i.e. between 20 and 50 wt %) and is diluted with additional quantities of liquid carrier as may be needed for storage or printing. For storage, the ink composition may be diluted to about 20% by weight of non-volatile solids (NVS). Immediately prior to use, the concentrate can be diluted with additional liquid carrier to a concentration of about 1 wt % to about 10 wt % of NVS.

In some examples, the ink composition of the present disclosure can be used in inkjet printing method. A non-limiting example of a suitable inkjet printing technique includes drop-on-demand inkjet printing, which encompasses thermal and piezoelectric inkjet printing. Suitable printers include portable drop-on-demand inkjet printers (e.g., handheld printers, arm mountable printers, wrist mountable printers, etc.), desktop drop-on-demand inkjet printers, page wide array drop-on-demand printers/copiers or high-speed production printers.

In some examples, the ink composition can be used in a method of forming printed images on media surfaces in a heated environment. The method includes projecting a stream of droplets of the ink composition onto a media surface to form the desired printed image. The ink composition may be established on the media substrate via any suitable inkjet printing techniques. Non-limitative examples of such inkjet printing techniques include thermal, acoustic, and piezoelectric inkjet printing. In some examples, such inkjet printing technique is a piezoelectric inkjet printing technique. In some other examples, the ink compositions are utilized in piezoelectric inkjet printers.

In some examples, a method of forming printed images on media substrate includes jetting an ink composition onto a media substrate via inkjet printing techniques, wherein the ink composition has a viscosity that is below about 70.0 cps and includes a non-VOC liquid carrier, dispersing agents and pigment particles having an average size of less than about 10 μm. In some other examples, such method of forming printed images on media substrate uses piezoelectric inkjet printing technique.

In some examples, the ink compositions disclosed herein are also suitable for use in a variety of applications, including display applications, electronic skins, blanket jetting applications, digital printing applications, ion-beam printing applications or other printing applications.

In some examples, the ink composition of the present disclosure is used as a charged liquid toner in electrophotographic printing process. In such printing process, a digital printer forms a latent image on a photosensitive imaging plate that is then developed by applying the ink to said photosensitive surface. The ink composition can then be transferred from the photosensitive imaging plate to an intermediate transfer member. In an ultimate step, the ink composition is transferred to the substrate in view of printing the desired image. In some examples, the ink composition of the present disclosure is used in a method of forming printed image on supporting substrates. More precisely, in some other examples, the ink composition is used in a method for developing electrostatic latent image. Such method includes forming an electrostatic latent image on a photo-responsive device, contacting the resulting image with the ink composition of the present disclosure, then transferring the image to a suitable substrate, and permanently fixing the image thereto. In some examples, a method of forming printed images on media substrate includes applying an ink composition onto an intermediate transfer surface, such as a blanket, then contacting the intermediate transfer surface with a final media substrate in view of obtaining the desired printing image on the media substrate. In such method, the ink composition has a viscosity that is below about 70.0 cps and contains a non-VOC liquid carrier, dispersing agents, and pigment particles having an average size of less than about 10 μm.

In another illustration, the ink composition of the present disclosure is used as electronic inks. In some examples, the ink composition is used as charged electronic inks for display applications such as e-skin and e-paper. In some other examples, the ink composition is used as electronic ink in a pixel of an electronic display. The electronic display can include a pixel, an electrode in the pixel, and the electronic ink in the pixel such as describe herein. In yet some other examples, the ink composition of the present disclosure can be used in displays with in-plane shutter architectures, where the colorant particles are moved laterally into and out of a field of view in a pixel or sub-pixel display cell. Examples of such inks are particularly suitable for this type of display, which tends to produce brighter and more colorful images than other displays.

The following examples illustrate a number of embodiments of the present compositions, systems and methods that are presently known. However, it is to be understood that the following are only exemplary or illustrative of the application of the principles of the present compositions, systems and methods. Numerous modifications and alternative compositions, methods, and systems may be devised by those skilled in the art without departing from the spirit and scope of the present disclosure. The claims are intended to cover such modifications and arrangements. Thus, while the present compositions, systems and methods have been described above with particularity, the following examples provide further detail in connection with what are presently deemed to be acceptable embodiments.

Ingredients and Abbreviations

Solsperse® 13940 is a polymeric hyperdispersants available from Lubrizol.

KC D Linseed oil is linseed oil available from Cargill Industrial.

Texanol® is a liquid carrier (2,2,4-trimethyl-1,3-pentanediol mono-isobutyrate) available from Sigma-Aldrich.

Isopar-L® is an oil-based carrier available from Exxon-Mobil Corporation.

Heuco® Blue 515400 is a blue pigment available from Heubach.

EXAMPLE 1

Process for Making Ink Compositions

Preparation of Control formulation #0: A 250 mL Nalgene® bottle is charged with 1 gram of Solsperse® 13940 and with 260 mL of Isopar-L®. The solution is subjected to an ultrasonic water bath (Branson B-22-4, 125 W) for 15 minutes and, subsequently, 10 grams of Heuco® Blue 515400 pigment is added to the solution at once. The suspension is subjected to ultrasonic water bath once again for 15 minutes and, after that, is incubated at room temperature for 12 hours. This initial dispersion is then subjected to high-pressure microfluidization (Microfluidics M-100Y with an 87-micron interaction chamber) at 100 psi (top gauge) with continuous cooling. The pigment dispersion is collected after 80 minutes into a glass storage bottle until testing.

Preparation of Formulation #1: A 250 mL Nalgene bottle is charged with 1 gram of Solsperse® 13940 and 207 mL of KC D linseed oil. The solution is subjected to an ultrasonic water bath (Branson B-22-4, 125 W) for 15 minutes and, subsequently, 10 grams of Heuco® Blue 515400 pigment is added to the solution at once. The suspension is subjected to ultrasonic water bath once again for 15 minutes and, after that, is incubated at room temperature for 12 hours. This initial dispersion is then subjected to high-pressure microfluidization (Microfluidics M-100Y with an 87-micron interaction chamber) at 100 psi (top gauge) with continuous cooling. The pigment dispersion is collected after 80 minutes into a glass storage bottle until testing.

Preparation of the Formulation #2: A 250 mL Nalgene bottle is charged with 1 gram of Solsperse® 13940 and with 209 mL of Texanol®. The solution is subjected to an ultrasonic water bath (Branson B-22-4, 125 W) for 15 minutes and, subsequently, 10 grams of Heuco® Blue 515400 pigment is added to the solution at once. The suspension is subjected to ultrasonic water bath once again for 15 minutes and, after that, is incubated at room temperature for 12 hours. This initial dispersion is then subjected to high-pressure microfluidization (Microfluidics M-100Y with an 87-micron interaction chamber) at 100 psi (top gauge) with continuous cooling. The pigment dispersion is collected after 80 minutes into a glass storage bottle until testing.

Preparation of the Formulation #3: A 250 mL Nalgene bottle is charged with 2 grams of Solsperse® 13940 and with 207 mL of Texanol®. The solution is subjected to an ultrasonic water bath (Branson B-22-4, 125 W) for 15 minutes and, subsequently, 10 grams of Heuco® Blue 515400 pigment is added to the solution at once. The suspension is subjected to ultrasonic water bath once again for 15 minutes and, after that, is incubated at room temperature for 12 hours. This initial dispersion is then subjected to high-pressure microfluidization (Microfluidics M-100Y with an 87-micron interaction chamber) at 100 psi (top gauge) with continuous cooling. The pigment dispersion is collected after 80 minutes into a glass storage bottle until testing.

These methods result in ink compositions such as illustrated in TABLE 1 below. The formulas are expressed in weight percentage (wt %) of each component of the ink composition.

TABLE 1

|  | Control #0 | Formulation #1 | Formulation #2 | Formulation #3 |
|---|---|---|---|---|
| Solsperse ® 13940 | 1% | 1.% | 1% | 2% |
| KC D linseed oil | — | 94% | — | — |
| Texanol ® | — | — | 94% | 93% |
| Isopar ® | 94% | — | — | — |
| Heuco ® Blue 515400 | 5% | 5% | 5% | 5% |

EXAMPLE 2

Ink Composition Performances

Ink formulations (#1, 2, and 3) and comparative ink formulation (#0) are evaluated for different parameters such as viscosity, conductivity and particle size. Ink formulations (#1, 2, and 3) and comparative ink formulation (#0) are also evaluated for ink performances such as printability, page attribute tests and storage stability. Such tests are performed by using the inks in piezoelectric inkjet device with Dimatix® DMP and Q-class® printheads. All results are illustrated in TABLE 2.

TABLE 2

|  | Control #0 | Formulation #1 | Formulation #2 | Formulation #3 |
|---|---|---|---|---|
| Viscosity (in cP) | 3.0 | 75.0 | 35.0 | 28.4 |
| Conductivity (in pS/cm) | 44.6 | 156 | 1200 | 1300 |
| Particle size (in nm) | <1000 | <1000 | 144 | 121 |
| Stability | No | Yes | Yes | Yes |
| Flooding issues | Yes | Yes | No | No |
| Nozzle failure | Yes | Yes | No | No |

The conductivity of the ink is evaluated using a conductivity-meter. The particle's conductivity is expressed in pS/cm. The viscosity is evaluated using a kinematic viscometer. The particle size is evaluated using a dynamic light scattering apparatus such as Malvern ZetaSizer® and Microtrac® S3500. The stability is evaluated visually over the course of 2 weeks while allowed to stand in ambient conditions. Ink compositions are considered to be stable when the dispersions do not show visual sedimentation. The control formulation shows sedimentation after 1 week. The formulations 1, 2 and 3 are stable for at last two weeks.

The ink formulations (#0, 1, 2 and 3) are jetted using a Dimatix® DMP 2800 piezoelectric printhead (10 pL drop volume) at firing frequencies ranging from 1 to 50 kHz (30V driving voltage at 30° C.). Flooding issues and nozzle failures are evaluated using a strobe camera to capture real-time images.

Ink composition according to formulation #2 is able to print up to 50 kHz without nozzle failure (with all 15 nozzles at 30V, 40 kHz and 50 kHz) at 30° C. When jetting ink formulation #2 using Dimatix® DMP piezoelectric printhead, it is noted that the orifice remains clean as ink is ejected from the nozzles; whereas when using control formulation #0 a composite image is jetted from one nozzle over time. The control formulation #0 shows severe flooding and puddling issues on the printhead orifice plate.

Formulation #2 jets uniform spherical droplets without noticeable satellite and puddling. The ink formulation #2 demonstrates good consistency in the particle size distribution over extended period of time. In addition, ink formulation #2 delivers good highlighter smear-fastness and dry-rub resistance on commercial print media such as HP Multipurpose ColorLock®, Premium, Edgeline® and NewPage® Indigo.

The printing, printed with ink compositions according to embodiments of the present disclosure, demonstrates Sharp line acuity (line width of about 80 μm) and excellent printed patterns when printed on a HP Premium Inkjet paper. In addition, it demonstrates well-defined jetted circular dots (diameter of about 30 μm) and very good sharp line acuity (line width of about 50 μm) when printed on an elastomeric blanket.

The invention claimed is:

1. A non-aqueous solvent based ink composition having a viscosity which is below about 70.0 cps and comprising:
   a) a non-VOC liquid carrier, the non-VOC liquid carrier being an ester alcohol and being present in an amount ranging from about 25 wt % to about 99 wt % of the total weight of the composition;
   b) dispersing agents;
   c) pigment particles exhibiting color in visible light and having an average size of less than about 10 μm; and
   d) a charge adjuvant.

2. The non-aqueous solvent based ink composition according to claim 1 wherein the ink composition has a viscosity within the range of about 1.0 to about 50.0 cps.

3. The non-aqueous solvent based ink composition according to claim 1 wherein the ester alcohol has the formula below:

$$R_1\text{—}C(O)\text{—}(O)\text{—}R_2\text{—}(OH)_n$$

wherein $R_1$ and $R_2$ are branched, cyclic or unbranched alkyl groups, each containing from 1 to 15 carbon atoms and n is from 1 to 4.

4. The non-aqueous solvent based ink composition according to claim 1 wherein the non-VOC liquid carrier is 2,2,4-trimethyl-1,3-pentanediol mono-isobutyrate.

5. The non-aqueous solvent based ink composition according to claim 1 wherein the pigment particles have an average particle size comprised between 100 nm and 700 nm.

6. The non-aqueous solvent based ink composition according to claim 1 wherein about 95% of the pigment particles have a particle size that is below 500 nm.

7. The non-aqueous solvent based ink composition according to claim 1 wherein pigment particles represent from about 1 wt % to about 50 wt % of the total weight of the ink composition.

8. The non-aqueous solvent based ink composition according to claim 1 wherein dispersing agents represent from about 0.1 wt % to about 50 wt % of the total weight of the ink composition.

9. The non-aqueous solvent based ink composition according to claim 1 wherein said composition has a weight percentage of non-volatile substances (NVS) comprised between about 3 wt % and about 80 wt %.

10. A method of forming printed images on media substrate comprising jetting the non-aqueous solvent based ink composition of claim 1 onto a media substrate via inkjet printing techniques.

11. The method of forming printed images on media substrate according to claim 10 using piezoelectric inkjet printing technique.

12. A method of forming printed images on media substrate, comprising:
   a) applying the non-aqueous solvent based ink composition of claim 1 onto an intermediate transfer surface; then
   b) contacting the intermediate transfer surface with a final media substrate in view of obtaining the desired printing image on the media substrate.

13. A method of producing an ink composition having a viscosity which is below about 70.0 cps, the method comprising:
   dissolving, at least, a dispersing agent in an ester alcohol non-VOC liquid carrier to form a mixture, the ester alcohol being present in an amount ranging from about 25 wt % to about 99 wt % of the total weight of the final ink composition;
   incorporating pigment particles into the mixture, the pigment particles exhibiting color in visible light; and
   microfluidizing, milling, or homogenizing the mixture until the pigment particles have an average size of less than about 10 μm;
   wherein the mixture is allowed to incubate before performing microfluidizing, milling, or homogenizing.

14. A method of producing an ink composition having a viscosity which is below about 70.0 cps, the method comprising:
   dissolving, at least, a dispersing agent in an ester alcohol non-VOC liquid carrier to form a mixture, the ester alcohol being present in an amount ranging from about 25 wt % to about 99 wt % of the total weight of the final ink composition;
   incorporating pigment particles into the mixture, the pigment particles exhibiting color in visible light;
   microfluidizinq, milling, or homogenizing the mixture until the pigment particles have an average size of less than about 10 μm: and
   subjecting the mixture to an ultrasonic water bath before the pigment particles are added and after the pigment particles are added.

* * * * *

UNITED STATES PATENT AND TRADEMARK OFFICE
CERTIFICATE OF CORRECTION

PATENT NO. : 8,356,893 B2  
APPLICATION NO. : 12/752763  
DATED : January 22, 2013  
INVENTOR(S) : Doris Pik-Yiu Chun et al.

Page 1 of 1

It is certified that error appears in the above-identified patent and that said Letters Patent is hereby corrected as shown below:

In the Claims:

In column 12, line 41, in Claim 14, delete "microfluidizinq," and insert -- microfluidizing, --, therefor.

In column 12, line 43, in Claim 14, delete "10 μm:" and insert -- 10 μm; --, therefor.

Signed and Sealed this  
Twenty-third Day of April, 2013

Teresa Stanek Rea  
*Acting Director of the United States Patent and Trademark Office*